United States Patent
Seals et al.

[11] Patent Number: 6,071,628
[45] Date of Patent: Jun. 6, 2000

[54] THERMAL BARRIER COATING FOR ALLOY SYSTEMS

[75] Inventors: Roland D. Seals, Oak Ridge; Rickey L. White, Harriman; Ralph B. Dinwiddie, Knoxville, all of Tenn.

[73] Assignees: Lockheed Martin Energy Systems, Inc.; Lockheed Martin Energy Research Corporation, both of Oak Ridge, Tenn.

[21] Appl. No.: 09/282,695

[22] Filed: Mar. 31, 1999

[51] Int. Cl.[7] ........................................... B32B 15/00
[52] U.S. Cl. ..................... 428/610; 428/633; 428/678; 428/937
[58] Field of Search ........................... 428/364, 402, 428/403, 404, 406, 610, 623, 629, 630, 632, 633, 701, 702, 650, 678, 680, 937; 148/537; 416/241 R, 241 B

[56] References Cited

U.S. PATENT DOCUMENTS

| | | | |
|---|---|---|---|
| 5,238,752 | 8/1993 | Duderstadt et al. | 428/623 |
| 5,262,245 | 11/1993 | Ulion et al. | 428/469 |
| 5,514,482 | 5/1996 | Strangman | 428/623 |
| 5,667,663 | 9/1997 | Rickerby et al. | 205/170 |
| 5,762,894 | 6/1998 | Takatori et al. . | |
| 5,856,027 | 5/1999 | Murphy . | |
| 5,876,860 | 3/1999 | Marijnissen et al. . | |
| 5,879,753 | 3/1999 | Zajchowski et al. . | |
| 5,891,267 | 4/1999 | Schaeffer et al. . | |

OTHER PUBLICATIONS

Mirkovich, *High Temperature–High Pressure*, vol. 8, pp. 231–235 (1976).

Brink, *J. Engineering Gas Turbines and Power*, vol. 111, pp. 570–577 (Jul. 1989).

Taylor, *Surface and Coatings Technology*, 54/55, 53 (1992).

Berndt, *Thermal Spray Society of ASM International* p. XIV–XV (Sep. 1997).

Gualco, et al, *ASM International*, Highly Porous Thick Thermal Barrier coatings Produced by Air Plasma Spraying of a Plastic–Ceramic Mixed Power, pp. 305–313, (1997).

Gutleber et al. *ASM International*, Processing and Thermal Cycling Effects on the Erosion Behavior of Thermal Barrier Coatings, pp. 285–289 (1997).

Harada, et al. *ASM International*, Field Evaluation of $2CaO-SiO^2-CaO-ZrO^2$ Thermal Barrier Coating on Gas Turbine Vanes, pp. 299–303, (1997).

Khor, et al. *ASM International*, Plasma Spraying of Functionally Graded NiCrAlY/Yttria Stabilized Zirconia Coatings Using Pre–Alloyed Powders, pp. 259–266, (1997).

Takahashi, et al. *ASM International*, Multi–Layered Thermal Barrier Coating for Land–Based Gas Turbines, pp. 232–325, (1997).

Ravichandran, et al. *ASM International*, Assessment of Thermal Barrier Coatings By Plasma Deposition, pp. 292–298, (1997).

Eguch, et al. *ASM International*, Microstructure Control of Zirconia Thermal Barrier Coatings by Using YAG Laser Combined Plasma Spraying Technique, pp. 325–321, (1997).

Primary Examiner—Timothy M. Speer
Assistant Examiner—Bryant Young
Attorney, Agent, or Firm—Hardaway/Mann IP Group

[57] ABSTRACT

An alloy substrate is protected by a thermal barrier coating formed from a layer of metallic bond coat and a top coat formed from generally hollow ceramic particles dispersed in a matrix bonded to the bond coat.

19 Claims, 1 Drawing Sheet

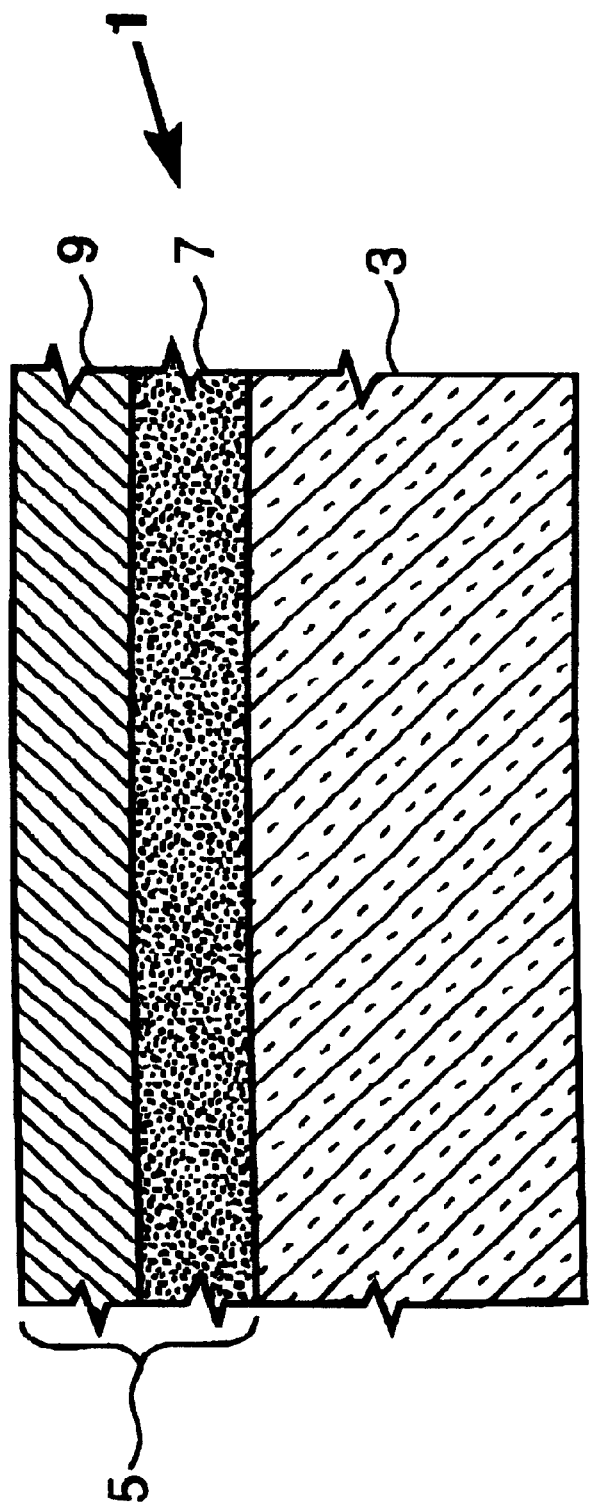
The Figure

THERMAL BARRIER COATING FOR ALLOY SYSTEMS

STATEMENT AS TO RIGHTS TO INVENTIONS MADE UNDER FEDERALLY SPONSORED RESEARCH AND DEVELOPMENT

The U.S. Government has rights in this invention pursuant to contract number DE-AC05-840R21400 between the Lockheed Martin Energy Systems Corporation and the Department of Energy.

BACKGROUND OF THE INVENTION

The invention relates generally to the art of coatings and more particularly to an improved thermal barrier coating for use on heat and oxidation sensitive metallic alloy systems.

Thermal barrier coatings are applied to hot sections of gas turbines or jet engines, such as combustor cans, nozzle guide vanes, and turbine blades. The function of such coatings is to increase engine efficiency by elevating the operational temperature or reducing the need for cooling air. The use of thermal barrier coatings in large turbines for land-based power generation is critically necessary for an acceptable operating lifetime. Because the superalloys of such turbines begin to melt at 1260° C. to 1290° C., it is necessary to use thermal barrier coatings and complex cooling mechanisms for today's turbine systems. The thermal barrier coating enables extension of component life by lowering the metal temperature. The engine reliability is increased by reducing the metal temperatures by 50 to 220° C., which also increases the engine efficiency by reducing the cooling air requirements, reduces fabrication costs by eliminating elaborate cooling schemes and, most of all, provides significant performance improvement and thus large cost savings by increasing the turbine inlet temperatures.

The development of high-performance thermal barrier coatings for higher temperature use is driven by the demand for higher fuel efficiency. There is a need to produce thermal barrier coatings with lower thermal conductivities by generating greater porosity without significantly affecting the thermo/chemical/mechanical strengths of the coating, or by replacing yttria with other ceramic materials such as ceria. With the maximum gas inlet temperature at present of approximately 1420° C., the use of today's ceramic thermal barrier coating system reduces the metal surface temperature of internally cooled airfoils by as much as 170° C. This enables an increase in the maximum combustion temperature necessary for saving fuel by more than 12% without increasing the surface temperature of the metal substrate. Future developments aim at utilizing inlet temperatures of 1760° C. which require improved, enhanced thermal barrier coatings. Control of the spallation behavior of the bond coat oxide by providing constraint effects due to the presence of a ceramic top coat that significantly influences the oxide growth kinetics and morphology, and by increasing the effectiveness of the oxygen barrier layers to reduce the oxide growth rate, is critically important to the performance of the thermal barrier coating system.

There is thus a continuing and pressing need for improved thermal barrier coatings so as to advance the efficiency and life of turbine systems.

SUMMARY OF THE INVENTION

It is thus an object of this invention to provide an improved thermal barrier coating with lower thermal conductivity.

It is a further object of this invention to provide such a thermal barrier coating with no loss in mechanical strength.

It is a further and more particular object of this invention to provide such a thermal barrier coating with a low oxygen transport so as to decrease oxidation of an underlying substrate.

It is a further and yet more particular object of this invention to provide such a thermal barrier coating which has a lower thermal expansion differential between the substrate and such coating.

These, as well as other objects, are accomplished by an article which has a metallic substrate having a thermal barrier coating thereon formed from a bond layer bonded to the substrate with a top coat layer formed of hollow ceramic particles dispersed in a matrix bonded to the bond layer.

BRIEF DESCRIPTION OF THE DRAWING

The FIGURE of the drawing schematically depicts an article having a thermal barrier coating in accordance with this invention.

DETAILED DESCRIPTION

In accordance with this invention it has been found that oxidation and heat-sensitive alloys may be protected and insulated from such deleterious effects by superior thermal barrier coating systems with a lower thermal conductivity, lower oxygen transport, and enhanced stress tolerance which have heretofore been unavailable. This invention also provides selective porosity level to bring about these qualities. Various other advantages and features will become apparent from a reading of the following description.

The single FIGURE of drawing schematically illustrates an article 1 in accordance with this invention. A substrate layer 3 is generally the alloy or super alloy structure sought to be protected from heat and oxidation by the thermal barrier coating 5 of this invention. Such substrate layer will generally be the material of construction of the turbine or some other structure needing such protection. The thermal barrier coating 5 is formed of at least two layers, a bond coat layer 7 and a top coat layer 9. The bond coat layer may be the type of material normally utilized with current thermal barrier coatings. Generally, such bond coating is formed from cobalt, nickel, iron, or alloys and mixtures thereof. Typical bond are formed from MCrAlY where M is selected from cobalt, nickel, iron or mixtures thereof.

The top coat layer in accordance with this invention is a dispersion of hollow ceramic particles in a matrix. The matrix is generally a ceramic, and preferably partially stabilizes zirconia (PSZ). The zirconium is stabilized by the addition of 6–8% $Y_2O_3$. The hollow ceramic particles may take a variety of shapes, such as spheres, cylinders, rods, or generally irregular shapes. The hollow ceramic particles are generally commercially available as further indicated below. The hollow ceramic particles, together with the matrix material are applied by conventional thermal spray techniques. The hollow ceramic particles may also be applied or co-deposited with and within the bond coat layer in a graded fashion so that there is a gradual increase in the topcoat layer from 100% MCrAlY to 100% ceramic, either with or without the hollow ceramic particles. The hollow ceramic particles of the top coat are generally commercially available and identified as the microspheres. The microspheres and their metallic matrix may be applied to the bond coat area by conventional thermal spray techniques, as can the bond coat layer.

The present invention provides a top coat coating with enhanced thermal insulation, decreased oxygen transport, and a more stress-tolerant system. The concept of the invention can be incorporated into the structure of any top coating thermal barrier coating system. The invention provides a top coated thermal barrier coating system with lower thermal conductivity without decreasing the mechanical strengths of the coating system, and decreases the rate of oxidation of the bond coat between the ceramic and substrate alloy while minimizing the stress level build-up.

By the methods of this invention, hollow structures such as hollow ceramic spheres, hollow ceramic cylinders, Cenospheres, Extendospheres, Z-Lights, Fillite, Metaspheres, and Environspheres (by-products of coal combustion), aerospheres (hollow alumina spheres), hollow ceramic glass bubbles, glass microspheres, Z-Lights, biospheres, hard metals, netallinic compounds etc., are incorporated into the coating structure of thermal barrier coatings.

The improved, enhanced thermal barrier coating of this invention can be applied by the use of thermal spray technology whereby the hollow ceramic structures are concurrently deposited into the coating. Depending on the size and size distribution of the particles, internal injection or external injection of the particles into the plasma spray gun and plasma jet may be required.

There has been extensive documentation of the fact that density of the thermal barrier coating has a large effect on the thermal conductivity of the coating. Mirkovich has shown that density has a significant effect on the thermal transport across thermal barrier coating by presenting results of thermal diffusivity vs density. The results show that as the porosity increases, the thermal diffusivity decreases with values of porosity from ~4 to ~35 producing values of thermal diffusivity from ~0.009 cm$^2$/s to ~0.004 cm$^2$/s, respectively. Taylor has shown that values of thermal diffusivity for 7% $Y_2O_3$—$ZrO_2$ range from 0.00495 cm$^2$/s to 0.0036 cm$^2$/s for room temperature to ~1200° C., respectively; whereas, the values range from 0.00485 cm$^2$/s to 0.00325 cm$^2$/s for 8% $Y_2O_3$—$ZrO_2$ for the same temperature range, respectively. A conclusion of the Taylor study was that the one key variable defining thermal conductivity, once composition is established, is the coating porosity. Typically, 6–8% YSZ coatings are produced with density at 85–88% theoretical density.

Thermal conductivity can be calculated using the equation:

$$K = \alpha \rho C_p$$

where K is thermal conductivity, $\alpha$ is thermal diffusivity, $\rho$ is density and $C_p$ is specific heat. Thus, the thermal conductivity is proportional to the density, and the greater the porosity, the lower are the values for K and $\alpha$. Therefore, it is possible to develop thermal spray parameters to obtain specific, relatively high levels of porosity between the deposited material building up the coating structure. A high specific level of porosity created by typical prior art thermal spray processes has a large influence on the mechanical strengths (low values) and stress tolerance (high stress, low tolerance values) of the thermal barrier coatings. Thus the prior art provides low mechanical strengths, high stress levels and low stress tolerance.

Typical literature thermal conductivity values for dense zirconia are in the range of 1.6 to 2.0 W/mK, whereas values for as thermally sprayed 6–8% yttria-stabilized zirconia (YSZ) range from 0.2 to 1.8 W/mK. Brink has reported thermal conductivity values of ZrO2 on a bond coat of NiCrAlY graded coatings as 1.13–1.15 W/mC for 5% porosity coatings and 0.8–0.94 W/mC for 12% porosity coatings, both at 400° C.

By the method of this invention, hollow ceramic particles such as hollow ceramic spheres, hollow ceramic cylinders, Cenospheres, Extendospheres, Z-Lights, Fillite, Metaspheres and Environspheres (all by-product with fly ash of coal fired steam plants), aerospheres (hollow alumina spheres), hollow ceramic glass bubbles, glass microspheres, Z-Lights, biospheres, etc., are incorporated into the coating structure of thermal barrier coatings. A typical thermal barrier coating or top ceramic coating is 6–8% yttria-stabilized zirconia (YSZ) accompanied by an MCrAlY bond coat (where M is Co, Ni, Fe, CoNi, etc.). The improved, enhanced thermal barrier coating of this invention can be applied by the use of thermal spray technology whereby the hollow ceramic structures are concurrently deposited into the coating. Depending on the size and size distribution of the particles, internal injection or external injection of the particles into the plasma spray gun and plasma jet may be required. As an example, cenospheres can be used which have diameters (O.D.) of 10 $\mu$m to 300 $\mu$m and other sizes may be used. Separation techniques allow selecting a narrow size distribution of these hollow ceramic spheres, i.e., 20 $\mu$m to 40 $\mu$m sized particles or another distribution. Cenospheres and hollow ceramic spheres are commercially available from several vendors including Sphere Services Inc., Oak Ridge, Tenn.; PQ Corporation, Chattanooga, Tenn. and Burwyn, Pa.; 3M/Zeelan Industries, Nitro, W. Va. and St. Paul, Minn.; Fillite, Alpharetta, Ga. and Runcorn, England; Microfine, Derby England; and Envirospheres, Australia. The concentration of the hollow ceramic structures can be easily controlled and has a direct, inversely proportional influence on the thermal conductivity of the coating.

Cenospheres are produced as a combustion by-product and are a component of fly ash found at coal fired utilities. The hollow ceramic microspheres are formed in boilers during the burning process of coal. The chemical composition is 55–65% $SiO_2$, 25–35% $Al_2O_3$, 1–5% $Fe_2O_3$, 0.5–1.5% $TiO_2$, with nitrogen and other gases comprising the core. The spheres have a specific gravity of 0.6–0.8, a density of 20–25 lbs./cu. ft., a pH in water of 6.0–8.0, a spherical shape, grey to light grey to off white color, a compressive strength of 3,000–5,000 psi, and a softening point at >1800 degrees F.

There are several hollow ceramic spherical (Cenospheres) powders available including the following:

|  | APO5-SG | TVO9-SG | TVO9-MG |
| --- | --- | --- | --- |
| Type: | | | |
| Specific Gravity: | 0.64 @ 22 C. | 0.54 | 0.54 |
| Bulk Density: | 23.4 lbs/cuft | 21.8 | 22.3 |
| pH in Water: | 6.3 @ 25 C. | 7.4 | 7.4 |
| Softening Point | >2700 F. | >2700 | >2700 |
| Size Range: | 10–300 m | 10–300 | 100–150 |
| Mean particle size: | 132 microns | 125 | 115 |
| Particle size distribution (10 min. Ro-Tap): | | | |
| Less than: | | | |
| >300 microns | 99.80% | 99.8 | 100 |
| >250 | 99.51 | 98.51 | 100 |
| >212 | 93.38 | 93.21 | 99.84 |
| >180 | 82.04 | 93.29 | 99.77 |
| >150 | 67.45 | 74.39 | 97.32 |

-continued

|  | APO5-SG | TVO9-SG | TVO9-MG |
|---|---|---|---|
| >106 | 26.11 | 31.93 | 36.31 |
| >75 | 6.80 | 6.45 | 7.59 |
| >45 | 1.07 | 0.88 | 1.89 |
| >38 | 0.75 | 0.61 | 1.35 |
| Chemical properties |  |  |  |
| $SiO_2$: | 60.33% | 54.5 | 54.5 |
| $Al_2O_3$: | 31.85 | 36.1 | 36.1 |
| $Fe_2O_3$: | 4.27 | 5.6 | 5.6 |
| $TiO_2$: | 1.30 | 1.3 | 1.3 |
| Crystalline $SiO_2$: | 0.28 | 0.14 | 0.14 |
| Organic Matter as C: | 0.09 | 0.20 | 0.20 |
| Oil matter content: | 0.20 | 0.01 | 0.01 |

From the above it is seen that a desired porosity and the properties flowing therefrom may be pre-engineered to develop a predetermined porosity.

As an additional embodiment of this invention the hollow ceramic particles may be coated with a metal coating which is capable of oxidizing. The oxidation process has a positive effect in slowing down the oxidation of the bond coat; thus slowing down the major failure mechanisms of the top coat. A typical failure mechanism of the prior art is brought about when the aluminum in the bond coat oxidizes, causing swelling, and thus high levels of stress and ablation of the top coat. Additionally, the hollow particles may also be introduced into the bond coat to provide further high stress tolerance. The particles may be distributed in the bond coat uniformly or graded outwardly from the substrate. Likewise, the particles may be uniform or graded in the matrix. Most preferred is a grading wherein the greatest concentration of particles is at the bond coat matrix interface.

The low thermal conductivity, high reflectivity, porosity, and microcracks associated with the top thermal barrier coating of this invention provide thermal insulation that results in the substrate protection. The bond coat provides oxidation protection to the substrate metal allow, increased mechanical adhesion of the ceramic top coat, and reduced differences in thermal expansion between the top coat and the metal substrate.

As an aid to further understanding the invention, the following specific example is given.

EXAMPLE

A Praxair Surface Technologies Model 4500 Plasma Spray System was used to produce test coupons. The model 4500 system is equipped with two powder feed systems which allow for two different powders to be deposited at varying rates at the same time. For this experiment, YSZ was fed at a constant rate of 30 grams per minute and the hollow ceramic particles were fed at two different rates for the two coupons. This resulted in each coupon containing different amounts of hollow ceramic particles but at the same thickness. An additional coupon was formed from spraying YSZ without the addition of any hollow ceramic particles to be used as a standard. The thermal diffusivity was measured and the thermal conductivity calculated for each. The two coupons produced in accordance with this invention had a 16% improvement in thermal properties as compared with the standard.

It is thus seen that the current invention provides a better, enhanced, controlled, and reproducible method of accomplishing specific engineered porosity levels, thus controlling the thermal conductivity of the thermal barrier coating system, without deleteriously influencing the mechanical strength of the coating system. The thermal barrier coating of this invention provides an article having superior resistance to oxidation and thermal degradation. The coating of this invention provides lower thermal conductivity, lower oxygen transport and enhanced stress resistance.

As many variations will become apparent to those in the art from a reading of the above description, which is exemplary in nature, such variations are embodied within the scope of this invention as defined by the following appended claims.

What is claimed is:

1. An article formed of an alloy substrate having a thermal barrier coating thereon said thermal barrier coating comprising:

a layer of metallic bond coat bonded to said substrate; and a top coat having hollow particles selected from the group consisting of ceramics, glasses, metals and metallic compounds dispersed in a matrix bonded to said bond coat.

2. The article according to claim 1 wherein said bond coat is formed of a material selected from a group consisting of cobalt, nickel, iron, aluminium, yttrium and alloys thereof.

3. The article according to claim 1 wherein said hollow particles are coated with aluminum or an aluminum alloy.

4. The article according to claim 1 wherein said hollow particles comprise an aluminosilicate.

5. the article according to claim 1 wherein said hollow particles are formed from a composition comprising $SiO_2$, $Al_2O_3$, $Fe_2O_3$, $ZrO_2$, $CeO_2$, $Y2O_3$, $HfO_2$ and $TiO_2$.

6. The article according to claim 1 wherein said hollow particles are formed from a material selected from the group consisting of silica and alumina silicates.

7. The article according to claim 1 wherein said generally hollow particles are substantially spherical.

8. The article according to claim 1 wherein said hollow particles are substantially cylindrical.

9. The article according to claim 1 wherein said hollow particles are rod shaped.

10. The article according to claim 1 wherein said hollow particles are irregular in shape.

11. The article according to claim 1 wherein said hollow particles have a metallic coating thereon.

12. The article according to claim 1 wherein said matrix is a ceramic material.

13. The article according to claim 1 wherein said ceramic matrix is yttria stabilized zirconia.

14. The article according to claim 1 wherein said top coat has a porosity.

15. The article according to claim 1 wherein said hollow particles are dispersed substantially uniformly throughout said matrix.

16. The article according to claim 1 wherein said hollow particles are distributed in a gradient within said matrix.

17. The article according to claim 1 further comprising hollow particles selected from the group consisting of ceramics, glasses, metals and metallic compounds dispersed within said metallic bond coat.

18. The article according to claim 17 wherein said hollow particles are dispersed uniformly within said metallic bond coat.

19. The article according to claim 17, wherein said hollow particles are dispersed in a gradient within said metallic bond coat.

* * * * *